United States Patent Office 2,834,749
Patented May 13, 1958

2,834,749

HIGH IMPACT STYRENE POLYMER PREPARED FROM STYRENE MONOMER CONTAINING CHLOROSULFONATED POLYETHYLENE AND PROCESS OF MAKING SAME

Ival O. Salyer and James A. Herbig, Dayton, Ohio, assignors to Monsanto Chemical Company, St. Louis, Mo., a corporation of Delaware No Drawing. Application December 26, 1952
Serial No. 328,126

7 Claims. (Cl. 260—30.6)

This invention relates to polymerization of styrene. A specific aspect of the invention relates to polystyrene of high impact strength.

Polystyrene is one of the most important plastics of commerce. Its many valuable properties are well known. However, one of its principal drawbacks is lack of ability to withstand impact shocks. There is need for improvement of this property as well as various of the other properties of polystyrene including tensile elongation and flexural deflection. It has previously been proposed to improve polystyrene by incorporating therein other polymeric materials. However, it was believed that such materials must be of the same general chemical nature as the polystyrene itself in order to be compatible and give satisfactory results. While the use of plasticizers of numerous types is known, this means of improving the impact strength and other physical properties of polystyrene often lowers the heat distortion or softening point to such a degree as to make the product unsuitable for most applications. Furthermore, use of many plasticizers in polystyrene results in products which have a certain degree of undesirable tackiness.

An object of this invention is to provide an improved process for polymerizing styrene. Another object of the invention is to make a polystyrene of high impact strength. A further object is to improve various physical properties of polystyrene made by mass, suspension, or emulsion polymerization. A still further object of the invention is to improve the impact strength of polystyrene-type resins. Yet another object is to provide improved polystyrene-type resins which when plasticized result in products free from tack. Further objects and advantages of the invention will be apparent to one skilled in the art from the accompanying disclosure and discussion.

In accordance with the present invention we have discovered that addition of a minor amount of a sulfochlorinated polyethylene to styrene monomer, followed by polymerizing the latter in the presence of the former results in a product of superior toughness. The product of the invention has better tensile elongation, flexural deflection, and particularly better impact strength than commercial polystyrene. In marked contrast are blends containing the same proportions of polystyrene and sulfochlorinated polyethylene prepared by mechanically mixing separately formed polystyrene and sulfochlorinated polyethylene. The components of said mechanical blends are too incompatible for the blends to be of appreciable use, and the mechanical blends are white opaque products as compared with the clear transparent completely compatible products obtained by the present invention. Despite the entirely different chemical nature of sulfochlorinated polyethylene and polystyrene, our products have a high degree of homogeneity, readily undergo injection or compression molding or other operations which are standard for polystyrene, and the molded products have excellent surface lustre. Only a relatively small quantity, such for example as from 1 to 30 percent by weight of the total product and usually from 2 to 10 percent by weight, of the sulfochlorinated polyethylene gives excellent results.

In a preferred embodiment of our invention a chlorosulfonated polyethylene is dissolved in monomeric styrene. The resulting mixture is then subjected to mass polymerization under conditions resulting in a high total conversion of the styrene to resin having a molecular weight of at least 50,000 as determined by the well-known Staudinger calculation from the specific viscosity of a very dilute solution of the polymer. Usually it is preferred to employ no more than 10 weight percent of the chlorosulfonated polyethylene based on the combined weight of styrene and chlorosulfonated polyethylene.

The terms "chlorosulfonated" and "sulfochlorinated" are used interchangeably herein without any intention of expressing different meanings thereby. Chlorosulfonated polyethylenes are well-known to the art, for example the commercial product sold under the trade name of "Hypalon" is a chlorosulfonated polyethylene. Chlorosulfonated polyethylenes are made by chlorination and sulfonation of normally solid high molecular weight polymers of ethylene. Such polymers, prior to treatment to convert them to the chlorosulfonated derivatives, usually have a molecular weight of at least 6,000 and preferably for the practice of our invention have a molecular weight of 20,000 to 30,000 or above. When examined by the X-ray diffraction technique these polyethylenes exhibit the presence of a crystalline phase. Polyethylenes to be chlorosulfonated can for example be readily made by subjecting ethylene, containing say 50 to 200 parts per million oxygen, to polymerization at very high pressures, for example at 20,000 to 40,000 pounds per square inch. Various other methods of preparing solid polyethylene, for instance by employing peroxide or azo catalysts and water or organic liquid reaction media along with moderately high pressures, for example 5,000 to 10,000 pounds per square inch, are well-known in the art. It is not outside the broad scope of our invention to utilize a chlorosulfonated ethylene polymer which is the result of chlorosulfonating a copolymer of ethylene and an ethylenically unsaturated comonomer employed in an amount not to exceed 15 weight per cent of the total ethylene plus comonomer for instance styrene, vinyl chloride, vinylidene chlorofluoride, methyl methacrylate. It is to be understood that such copolymers can be employed instead of ethylene homopolymer whenever reference is made herein to "polyethylene," and that the term "ethylene polymer" as used in the claims is inclusive of homopolymers and copolymers.

The chlorosulfonation can be effected in a number of different ways, and of course the products resulting from different methods of chlorosulfonation will not necessarily be full equivalents of each other, but rather will exhibit specific differences as well as important and fundamental similarities. One suitable and preferred type of chlorosulfonated polyethylene is made as described in U. S. Patent No. 2,586,363. As described therein, polyethyene can be chlorosulfonated by several procedures, to form a chlorosulfonated polymer having a preferred chlorine content of about 25 to about 37 percent by weight and a preferred sulfur content of 0.4 to 3 percent by weight. The chlorosulfonation can be effected for example by reacting a polyethylene of molecular weight say of at least 10,000 with chlorine plus sulfur dioxide, with $SO_2Cl_2$, or with $SO_2Cl_2$ plus chlorine. Another procedure is to chlorinate the polyethylene and thereafter introduce the sulfonyl group by one of the reagents just mentioned. According to said patent, No. 2,586,363, it is believed that the chlorosulfonated polyethylene contains polysulfonyl chloride groups. However, we do not desire to be limited in our invention by any particular theory of the molecular structure resulting from chlorosulfonating polyethylene. Reference is made to said patent for further details for preparing chlorinated polyethylenes which can be used in accordance with the present invention. Attention is also directed to various other procedures described in the prior art for making chlorosulfonated polyethylenes, for example U. S. patents, Nos. 2,212,786 and 2,405,971.

One very suitable chlorosulfonated polyethylene for use in our invention contains about 27.5 weight percent chlorine and about 1.5 weight percent sulfur. These two elements are chemically combined with a hydrocarbon chain, with most of the chlorine believed substituted on the chain and the sulfur believed combined with chlorine and attached to the chain as —$SO_2Cl$ groups. This material contains about one chlorine atom for every 6 to 7 carbon atoms, and one —$SO_2Cl$ group for every 90 to 130 carbon atoms. It is believed the substitution is random. The molecular weight is approximately 30,000.

While a wide variety of chlorosulfonated polyethylenes can be used in practicing our invention, we usually prefer them to have a chlorine content of from 10 to 50 weight percent and a sulfur content of from 0.2 to 10 weight percent.

While we do not desire to be bound by any theory as to how the advantages of the present invention are obtained, it is thought that the product made by polymerizing styrene containing chlorosulfonated polyethylene contains some chlorosulfonated polyethylene molecules as such and that probably a certain amount of interreaction or interpolymerization or linking also occurs between styrene and chlorosulfonated polyethylene molecules with resultant formation of what can be called "graft" polymer. It is entirely possible that a certain amount of splitting off of sulfonyl chloride or other chlorine and/or sulfur and oxygen containing groups from the chlorosulfonated polymer occurs leaving residual unsaturation capable of combining with styrene in a polymerization reaction. Another distinct possibility is that peroxide residues in the molecule resulting from use of peroxide catalysts during chlorosulfonation of polyethylene split out very readily under the conditions employed for polymerizing the styrene containing chlorosulfonated polyethylene, resulting not only in active centers in the polymer molecule for interreaction with styrene but also releasing trace amounts of peroxide or peroxide residues effective in themselves as polymerization catalysts. This latter theory is borne out to a considerable extent by lower than usual molecular weights of products obtained at given polymerization conditions when practicing the present invention, and also by the fact that a much more rapid polymerization of styrene containing chlorosulfonated polyethylene occurs at room temperature or under the influence of ultraviolet light than that obtained with styrene monomer alone. As is well-known, catalysts tend to lower the molecular weight of polystyrene and in order to obtain the desired high molecular weight products, a combination of reaction conditions should be chosen which will produce the desired high molecular weight final product, as is well within the skill of the art.

For example, use of increased pressure and/or reduced temperature increases the molecular weight of polystyrene. In the event it is desired to reduce the effects of the chlorosulfonated polyethylene on the polystyrene molecular weight, the chlorosulfonated polyethylene can be purified, for example by washing with a non-solvent such as methyl alcohol or by dissolving in a solvent such as hot toluene and then precipitating by pouring the solution into a non-solvent such as methanol. As indicated hereinabove, the invention is not dependent upon theories which may be advanced as to the course of reaction and/or reactions occurring during the polymerization of styrene containing chlorosulfonated polyethylene.

For the most satisfactory results the polymerization of styrene containing intimately dispersed chlorosulfonated polyethylene should be effected under such conditions as will result in (a) high degree of conversion of the styrene, measured by an alcohol solubles content of less than 5 weight percent and (b) high molecular weight polymer having a molecular weight of between 50,000 and 100,000 on the Staudinger scale although somewhat lower or higher molecular weights, for instance within the range of 30,000 to 150,000 are permissible. A large variety of reaction conditions or procedures for the polymerization can be employed with satisfactory results. Thus, the polymerization can be carried out in the absence of any added catalyst. Any of the well-known styrene polymerization catalysts, such as organic peroxides, inorganic peroxides, organic hydroperoxides, azo compounds and the like can be used in small quantities. The polymerization can be effected at atmospheric or superatmospheric pressures.

One prefered embodiment of our invention comprises subjecting styrene monomer containing chlorosulfonated polyethylene in amounts such as to improve the impact strength of the polystyrene, to polymerization at a pressure of at least 5,000 pounds per square inch for a time to effect greater than 95 percent conversion to high molecular weight polystyrene.

The invention can be carried out without the use of an added catalyst, or sufficient catalyst can be employed to give a desired reaction rate. Suitable catalysts are of the free radical promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula R'OOR" wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example suitable peroxide-type catalysts include: benzoyl peroxide, ditertiary butyl peroxide, tertiary butyl hydroperoxide, diacetylperoxide, diethylperoxycarbonate, dimethylphenylhydroperoxide (known also as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N—; the dangling valences can be attached to a wide variety of organic radicals, at least one, however, preferably being attached to a tertiary carbon atom. By way of example of suitable azo-type catalysts can be mentioned α,α'-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy-type or azo-type polymerization catalyst is used in small but catalytic amounts, which are generally not in excess of 1 percent by weight based upon the monomeric material. A suitable quantity is often in the range of 0.05 to 0.5 percent by weight.

While this invention is directed particularly to the homopolymerization of styrene containing chlorosulfonated polyethylene, it is permissible and not outside the broad scope of the invention to have other polymerizable unsaturated comonomers present during the polymerization in amounts preferably not to exceed 15 weight percent of the total styrene plus comonomer, provided such comonomer, for example α-methylstyrene, vinyl toluene, ethyl acrylate, butyl acrylate, acrylonitrile, is not of such nature of or such quantity as to affect adversely the desired characteristics of the resulting styrene copolymer product. It is to be understood that such copolymers can be employed instead of styrene homopolymer whenever reference is made herein to "polystyrene," and that the term "styrene polymer" as used in the claims is inclusive of homopolymers and copolymers.

We have found that an intimate admixture of the preformed chlorosulfonated polyethylene in the styrene monomer gives best results. Although effecting polymerization in a system wherein the chlorosulfonated polyethylene is merely swelled in the styrene monomer is permissible, it is best to obtain as complete a dispersion as possible, with the aid of agitation if necessary. Use of a temperature at the initiation of the process sufficiently high to effect solution of the chlorosulfonated polyethylene in the styrene monomer is desirable.

In accordance with one embodiment of the invention, the polymerization of styrene containing swelled or dissolved chlorosulfonated polyethylene is effected in mass, i.e., the reaction mixture consists of the monomeric material plus chlorosulfonated polyethylene plus any catalyst used, and no added solvent or other reaction medium is present.

Polymerization can also be carried out by the suspension or emulsion techniques. For suspension polymerization a reaction medium such as water is used together with a small amount of a suspending agent, for example tricalcium phosphate, to give a suspension of particles of initial reaction mixture which particles grow in size as the polymerization proceeds, yet are not of such small size as to result in a permanently stable latex. To effect emulsion polymerization, sufficient amount of emulsifying agent, for example a water-soluble salt of a sulfonated long chain alkyl aromatic compound, is employed in suitable quantity along with vigorous agitation whereby an emulsion of the reactants in water is formed and the product is obtained in the form of a latex. The latex can then be coagulated if desired by known methods and the polymer separated from the water. The presence of dissolved chlorosulfonated polyethylene in the styrene monomer makes it more difficult to form an emulsion when practicing our invention by the emulsion polymerization technique than is the case of styrene monomer alone. However, the emulsion technique has certain advantages particularly in that a very high degree of conversion is rapidly attained.

Use of an added organic solvent during the polymerization is apt to result in too low a molecular weight product, and therefore if such a solvent is desired other conditions should be such as to result in a high molecular weight product; for example, the use of a very high pressure tends to increase the molecular weight of the product under these circumstances.

Conventional recipes and procedures for effecting mass, suspension and emulsion polymerization of styrene are so well-known to those skilled in the art, that they need not be reiterated here. Polymerization can be effected by any of the conventional procedures with suitable modifications where necessary because of the presence of the chlorosulfonated polyethylene in the monomeric styrene. As indicated above, for best results conditions should be selected which result in a high conversion to a high molecular weight. Examples of polymerization procedures are given hereinafter as a guide to those skilled in the art.

Incorporation of a small amount, such as from 0.5 to 5 weight percent based on the final product, of a high molecular weight mineral oil further improves the properties of the product, particularly the tensile elongation and flexural deflection. It is preferred to limit the quantity of mineral oil to an amount sufficient to improve the flexural deflection and/or tensile elongation of the blend but insufficient to adversely affect to an important degree the heat distortion or softening temperature of the polystyrene-chlorosulfonated polyethylene blend, e. g., not lower the A. S. T. M. heat distortion temperature by more than 10 to 15° C.

When the present invention is to be practiced in an embodiment that includes the use of mineral oil, the most preferred method of forming an intimate mixture comprising mineral oil, chlorosulfonated polyethylene and polystyrene is to incorporate both the mineral oil and preformed chlorosulfonated polyethylene in styrene monomer and subject the resulting material to polymerization. For best results such polymerization should be carried to a high conversion, such as greater than 95 percent conversion to high molecular weight polystyrene, and at conditions also resulting in a polystyrene product having a molecular weight of 50,000 to 100,000, as determined by the Staudinger method from the specific viscosity of a very dilute solution of the polymer.

Rather than incorporate both mineral oil and chlorosulfonated polyethylene in styrene monomer, a styrene monomer containing preformed chlorosulfonated polyethylene can be polymerized and the resulting polystyrene-type resin then mechanically admixed with the desired quantity of mineral oil.

The mineral oil used should be of lubricating viscosity for best results; within the range of lubricating viscosities of course lies a considerable variation in actual viscosity and properties. Mineral lubricating oils are quite well-known to those skilled in the art. The mineral oil employed should be principally aliphatic hydrocarbon in character, and preferably at least 80 percent should have an initial boiling point of at least 300° C. corrected to atmospheric pressure. Incorporation of considerable quantities of lower molecular weight material tends to affect the physical properties of the finished product adversely. While a residual oil can be used, it is much preferred that the high molecular weight mineral oil be a distillate. The mineral oil is best obtained from petroleum sources, and the extent of paraffinicity, naphthenicity, and aromaticity will, of course, be dependent on the particular type of petroleum used as source material. However, it should be principally aliphatic paraffinic in nature. Where opaque or colored plastics are permissible products, the high molecular weight mineral oil employed in the invention can have some color. However, where a clear product is required, the mineral oil should undergo sufficient purification treatment to be clear and essentially free from color. In some instances such treatment will involve only distillation, whereas with other types of mineral oils it may be necessary to subject the same to rigorous chemical treatment, e. g., sulfonation or aluminum chloride treatment, and/or treatment with adsorbents, in order to obtain a clear mineral oil, which treatments will also serve to remove most or all of any aromatic hydrocarbons present.

Among high molecular weight mineral oils contemplated by the invention are those which do not yield paraffin, i. e., normally solid paraffin wax, whether or not such paraffin is contained therein, essentially comprising refined substantially paraffin-free mineral or petroleum oils. An optimum embodiment of such oil is that referred to as "liquid petrolatum." The liquid petrolatum may or may not contain paraffin, but if present, the paraffin should be present in a state whereby it is not susceptible to removal, at least under normal conditions. A suitable liquid can be defined as the oil which is obtained by the distillation of that portion of petroleum which boils between 330° C. and 390° C. and is obtained after removal of the lighter constituents of the petroleum; the distillate fraction obtained between 330° C. and 390° C. is subjected to a comprehensive purification treatment with sulphuric acid and caustic soda, followed by filtration while hot through a decolorizing carbon. On cooling said purified fraction, some solid paraffin separated out, and the liquid portion is subjected to redistillation, with that portion boiling above 360° C., being retained as the liquid petrolatum. Suitable liquid petrolatums are commercially available, for example those sold under the trade names "Nujol" and "Fractol." While liquid petrolatum or "mineral oil" as generally available, especially when in accordance with the requirements of the U. S. Pharmacopoeia, satisfies the said details of production, it will be understood that within the scope of the present invention, a reasonable latitude as to the characteristics of the product may be contemplated. Thus, the temperature range indicated for the distillate fractions may be deviated within a reasonable scope without unduly affecting the value of the fraction for purposes of the present invention.

As indicated above, one of the advantages of the poly-blends of this invention is that they can be plasticized with the usual plasticizers. The resulting materials have less tack than polystyrene per se plasticized with the same plasticizer in the same amount. By way of example of plasticizers which can be used the following may be mentioned: abietic acid derivatives, such as methyl abietate; adipic acid derivatives, such as di-n-hexyl adipate, dioctyl adipate, dibutoxyethyl adipate; citric acid derivatives, such as tri-n-butyl citrate, acetyl triethyl citrate; chlorinated biphenyls, such as are sold under the trademark "Aroclor"; glycol derivatives, such as triethylene glycol di-2-ethyl butyrate, triethylene glycol di-2-ethyl hexoate; lauric acid derivatives, such as butyl laurate, amyl laurate; oleic acid derivatives, such as methyl oleate, n-propyl oleate; phosphoric acid derivatives, such as triethyl phosphate, tributyl phosphate, cresyl diphenyl phosphate; phthalic acid derivatives, such as dimethyl phthalate, dioctyl phthalate; sebacic acid derivatives, such as dihexyl sebacate, dioctyl sebacate; chlorinated paraffins; urea derivatives, such as tetrabutyl urea; sulfonic acid derivatives, such as toluene sulfonamide, n-ethyl toluene sulfonamide.

Plasticizers can be incorporated into the polystyrene polyblend containing sulfochlorinated polyethylene in any of the usual manners, for example by addition of the plasticizer to the polymeric material on hot mill rolls, by mixing in a Banbury mixer, by "dry" blending prior to milling, or by adding the plasticizer to the styrene monomer prior to polymerization of same containing chlorosulfonated polyethylene provided the polymerization is not adversely affected by the presence of the particular plasticizer.

The following examples are provided to illustrate some of the advantages of our invention. It will be appreciated that numerous variations from these specific details can be made without departing from the invention in its broadest aspects.

Example 1

To styrene monomer was added 2.5 percent, 5.0 percent and 10.0 percent of a sulfochlorinated polyethylene ("Hypalon S–2"). (The percentages are weight percent of the total weight of styrene plus "Hypalon.") These mixtures, containing no catalyst, were flushed thoroughly with nitrogen and sealed in glass tubes. The mixtures were then polymerized for 45 hours at 120° C. followed by 4 hours at 180° C. The polymerized products were removed from the tubes and evaluated as follows:

Composition—95.5 styrene, 2.5 chlorosulfonated polyethylene:
(1) The addend was soluble in the styrene monomer.
(2) The polymerized product was homogeneous, clear, and transparent.
(3) Tensile strength—9,016 p. s. i. Tensile elongation—5.8%.
(4) Flexural strength—16,201 p. s. i. Flexural deflection—0.39 inch.
(5) Izod notched impact strength—1.11 ft. lbs. per inch of notch.
(6) Alcohol solubles content—1.75%.
(7) Specific viscosity—0.1% in xylene at 210° F.= 0.120.
(8) Material injection molded well and had a good surface.

Composition—95.0 styrene, 5.0 chlorosulfonated polyethylene:
(1) The addend was soluble in the styrene monomer.
(2) The polymerized product was homogeneous, clear, and transparent.
(3) Tensile strength—8,000 p. s. i. Tensile elongation—5.0%.
(4) Flexural strength—16,083 p. s. i. Flexural deflection—0.24 inch.
(5) Izod notched impact strength—0.33 ft. lb.
(6) Alcohol solubles content—1.25%.
(7) Specific viscosity (0.1% in xylene at 210° F.)—on original material—0.103. Specific viscosity (0.1% in xylene at 210° F.)—on alcohol soluble residue—0.100.
(8) Material injection molded well and had a good surface.

Composition—90.0 styrene, 10.0 chlorosulfonated polyethylene:
(1) The addend was soluble in the styrene monomer.
(2) The polymerized product was homogeneous, clear, and transparent.
(3) Tensile strength—4,200 p. s. i. Tensile elongation—3.3%.
(4) Flexural strength—6,638 p. s. i. Flexural deflection—0.07 inch.
(5) Izod notched impact strength—0.53 ft. lb.
(6) Alcohol soluble content—3.54%.
(7) Specific viscosity (0.1% in xylene at 210° F.)—on original material—0.106. Specific viscosity (0.1% in xylene at 210° F.)—on alcohol soluble residue—0.094.
(8) Material injection molded well and had a good surface.

Example 2

The increasing brittleness of the products of Example 1 as percentage of chlorosulfonated polyethylene in the products increased is attributed to the comparatively low molecular weight of the products obtained in the polymerization blends, and also perhaps to some extent to the lower conversion of monomer to high molecular weight polymer as indicated by increasing alcohol solubles content.

These effects however can be overcome by effecting polymerization with the same materials as set forth in Example 1 but under polymerization conditions resulting in increased molecular weight, for example as follows.

2.5 percent "Hypalon" was added to styrene monomer and the mixture agitated at room temperature until solution was effected (about 1.5 hours). The solution was then filtered to remove any gel particles that might have been present. Emulsion polymerization conditions were then employed which were calculated to lead to a molecular weight of 60,000 to 70,000 (that of commercial polystyrene). A 3-liter flask was charged with 1450 grams water in which was dissolved 1.0 gram of emulsifying agent (Acto-450). A monomer solution was prepared containing 500 grams of the filtered, admixed styrene and 0.10 percent tertiary dodecyl mercaptan. In addition, to one-third of the monomer solution was added 1.0 gram of Acto–450. Catalyst solution was prepared by dissolving 1.0 gram of $K_2S_2O_8$ in 50 grams of water.

The flask was fitted with stirrer, thermometer, 2 graduated dropping funnels, reflux condenser and Glas-col heating mantle. The flask charge was heated to low reflux, allowed to cool to 96.5° C., and 100 ml. of monomer solution (not containing emulsifier) and 10 ml. catalyst solution added. The remaining monomer and catalyst were then added at a steady rate over a one hour period, with the monomer containing the emulsifier being added last. As soon as all the monomer had been added the unpolymerized monomer was removed by steam distillation. The finished latex, after cooling, was coagulated and the polymer separated and dried. The following improved physical properties were obtained:

(1) Tensile strength at yield—9,110 p. s. i.
    Tensile strength at failure—8,900 p. s. i.
    Tensile elongation at yield—7.5%
    Tensile elongation at failure—10.0%
(2) Flexural strength—17,080 p. s. i. material yielded
    Flexural deflection—0.45 inch material yielded
(3) Notched izod impact strength—1.7 ft. lbs.

It will be noted significant improvement in physical properties (attributable to higher molecular weight) was effected by employing the aforementioned polymerization conditions.

A high pressure polymerization of styrene and 10.0 percent "Hypalon" was made with polymerization conditions employed leading to substantially complete conversion in about 2 hours. From observation of the following physical properties it was concluded that desirable molecular weight was not obtained.

(1) Tensile strength at failure—8,487 p. s. i.
    Tensile elongation at failure—7.3%
(2) Flexural strength—14,080 p. s. i.
    Flexural deflection—0.20 inch
(3) Notched izod impact strength—0.496 ft. lb.

It should be noted however a significant improvement in physical properties did occur in comparison to a blend of comparable concentration which was mass-polymerized at atmospheric pressure (3rd section of Example 1). Lower initial polymerization temperature in the instance of "atmospheric mass-polymerized" blend would result in improved molecular weight with consequently improved physical properties.

*Example 3*

Styrene-chlorosulfonated polyethylene polymerization blends of the present invention can be plasticized with ordinary ester-type plasticizers to produce a very flexible, low modulus material which does not have the tackiness accompanying the plasticization of polystyrene per se to a comparable degree.

A polymerization blend of 90 percent styrene and 10 percent "Hypalon" (chlorosulfonated polyethylene) prepared in the manner described in Example 1 was plasticized with 28 weight percent, based on weight of unplasticized material, of dioctylphthalate. This ester plasticizer was incorporated with the polyblend by gradual addition of same to polymer on hot mill rolls (174° C.). The plasticized material was not at all tacky, and had the following Clash-Berg properties:

$T_f$ (135,000 p. s. i. modulus), −4.5° C.
$T_{2000}$ (2,000 p. s. i. modulus), 39.4° C.
Stifflex range (difference between $T_f$ and $T_{2000}$), 43.9° C.

*Example 4*

Making a product exactly as in the second part of Example 1, but in the presence of 1.5 weight percent mineral oil, significantly improved the flexural deflection and tensile elongation without affecting the impact strength adversely to a significant extent.

To styrene monomer containing 1.5 percent "Nujol" mineral oil (a high molecular weight lubricating mineral oil meeting U. S. P. standards for internal use) was added 5.0 percent of "Hypalon S–2" chlorosulfonated polyethylene. The mixture was flushed with nitrogen and sealed in a glass tube under nitrogen atmosphere without catalyst. The mixture was then polymerized 45 hours at 120° C. followed by 4 hours at 180° C. The resulting polymerized product was examined and evaluated as follows:

Composition—93.5 styrene, 5.0 chlorosulfonated polyethylene, 1.5 mineral oil:
  (1) The addend was soluble in the styrene monomer.
  (2) The polymerized product was homogeneous, clear, and transparent.
  (3) Tensile strength—7,730 p. s. i. Tensile elongation—7.2%.
  (4) Flexural strength—14,510 p. s. i. Flexural deflection—0.31 inch.
  (5) Izod notched impact strength—0.31 ft. lb.

While the invention has been described with particular reference to various preferred embodiments thereof, it will be appreciated that numerous modifications and variations are possible without departing from the invention.

We claim:

1. Mass-polymerized styrene polymer containing from 1 to 10 weight percent (based on total product) preformed chlorosulfonated polyethylene which was present in the monomeric styrene from which said styrene polymer was derived by mass polymerization to a high molecular weight resin, said polyethylene having had a molecular weight of at least 6,000 prior to chlorosulfonation.

2. A process for making styrene polymer resin of high impact strength which comprises subjecting a mixture comprising styrene having chlorosulfonated polyethylene dissolved therein in an amount up to 20 parts by weight of chlorosulfonated polyethylene per 100 parts styrene plus chlorosulfonated polyethylene, to polymerization effecting a high degree of conversion, said chlorosulfonated polyethylene having a chlorine content of 25 to 37 weight percent and a sulfur content of 0.4 to 3 weight percent.

3. Styrene polymer containing from 1 to 30 weight percent (based on total product) preformed chlorosulfonated ethylene polymer which was present in the monomeric styrene from which said styrene polymer was derived by polymerization to a high molecular weight resin, said ethylene polymer having had a molecular weight of at least 6,000 prior to chlorosulfonation.

4. Styrene polymer according to claim 3 also containing from 0.5 to 5 weight percent of a high molecular weight mineral oil which is principally aliphatic hydrocarbon in character and at least about 80 percent of which has a boiling point of at least 300° C. corrected to atmospheric pressure.

5. Styrene polymer according to claim 3 also containing an ester plasticizer.

6. Styrene polymer according to claim 3 wherein said chlorosulfonated ethylene polymer is chlorosulfonated polyethylene having a chlorine content of 10 to 50 weight percent and a sulfur content of 0.2 to 10 weight percent.

7. A process for making styrene polymer resin of high impact strength which comprises subjecting a mixture comprising styrene having chlorosulfonated ethylene polymer intimately dispersed therein in an amount up to 30 parts by weight of chlorosulfonated ethylene polymer per 100 parts styrene plus chlorosulfonated ethylene polymer, to polymerization effecting a high degree of conversion, said ethylene polymer having had a molecular weight of at least 6,000 prior to chlorosulfonation.

No references cited.